(12) United States Patent
Zhang et al.

(10) Patent No.: US 10,885,169 B2
(45) Date of Patent: Jan. 5, 2021

(54) METHOD AND APPARATUS FOR INVOKING FINGERPRINT IDENTIFICATION DEVICE, AND TERMINAL

(71) Applicant: Guangdong Oppo Mobile Telecommunications Corp., Ltd., Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 250 days.

(21) Appl. No.: 15/895,250

(22) Filed: Feb. 13, 2018

(65) Prior Publication Data
US 2018/0173865 A1    Jun. 21, 2018

Related U.S. Application Data

(63) Continuation of application No. PCT/CN2016/091801, filed on Jul. 26, 2016.

(51) Int. Cl.
*G06F 21/32* (2013.01)
*G06F 9/48* (2006.01)
(Continued)

(52) U.S. Cl.
CPC .............. *G06F 21/32* (2013.01); *G06F 9/48* (2013.01); *G06F 9/5011* (2013.01);
(Continued)

(58) Field of Classification Search
CPC .......... G06F 21/32; G06F 9/48; G06F 9/4843; G06Q 20/40145
(Continued)

(56) References Cited

U.S. PATENT DOCUMENTS 4,028,664 A * 6/1977 Monahan ................ G06F 9/462
710/48
5,867,705 A * 2/1999 Mano ..................... G06F 9/3851
710/244
(Continued)

FOREIGN PATENT DOCUMENTS

CN    101551837 A    10/2009
CN    103577739 A    2/2014
(Continued)

OTHER PUBLICATIONS

International search report issued in corresponding international application No. PCT/CN2016/091801 dated Oct. 27, 2016.
(Continued)

*Primary Examiner* — Tae K Kim
*Assistant Examiner* — Peiliang Pan

(57) ABSTRACT

A method and an apparatus for invoking a fingerprint identification device are provided. The method includes the following. When a request of a current application to invoke a fingerprint identification device is detected, whether the fingerprint identification device is occupied by a historical application is determined. When the fingerprint identification device is occupied by the historical application, whether the current application meets a preset invoking condition is determined, and then the fingerprint identification device is controlled to process the request of the current application according to the determination result.

16 Claims, 3 Drawing Sheets

(51) Int. Cl.
*G06F 9/50* (2006.01)
*G06K 9/00* (2006.01)
*G06Q 20/40* (2012.01)

(52) U.S. Cl.
CPC ..... *G06K 9/00013* (2013.01); *G06K 9/00087* (2013.01); *G06Q 20/40145* (2013.01)

(58) Field of Classification Search
USPC .......................................................... 726/19
See application file for complete search history.

(56) References Cited

U.S. PATENT DOCUMENTS

| | | | | |
|---|---|---|---|---|
| 7,562,362 | B1* | 7/2009 | Paquette | G06F 9/4881 714/100 |
| 7,676,610 | B2* | 3/2010 | Nakashima | G06F 13/126 710/22 |
| 8,238,911 | B2* | 8/2012 | D'Amore | G06F 9/5011 455/435.3 |
| 8,550,339 | B1 | 10/2013 | Newman et al. | |
| 8,604,906 | B1 | 12/2013 | Halferty et al. | |
| 9,218,474 | B1 | 12/2015 | Roth | |
| 9,596,236 | B2 | 3/2017 | Dunn et al. | |
| 9,824,199 | B2 | 11/2017 | Kshirsagar et al. | |
| 2002/0007408 | A1 | 1/2002 | Kalhour | |
| 2005/0210270 | A1 | 9/2005 | Rohatgi et al. | |
| 2008/0163232 | A1 | 7/2008 | Walrath | |
| 2009/0119773 | A1 | 5/2009 | D'Amore et al. | |
| 2009/0219915 | A1* | 9/2009 | Orcutt | H04W 72/02 370/347 |
| 2009/0276782 | A1 | 11/2009 | Wang et al. | |
| 2010/0144332 | A1* | 6/2010 | Savoor | H04W 72/1242 455/418 |
| 2012/0159599 | A1 | 6/2012 | Szoke et al. | |
| 2012/0263125 | A1 | 10/2012 | Tejaswini et al. | |
| 2012/0297394 | A1* | 11/2012 | Allen | G06F 9/526 718/103 |
| 2013/0088337 | A1 | 4/2013 | Blanchflower et al. | |
| 2014/0019873 | A1* | 1/2014 | Gupta | H04L 67/36 715/744 |
| 2014/0359757 | A1 | 12/2014 | Sezan et al. | |
| 2015/0067827 | A1* | 3/2015 | Lim | G06F 21/32 726/19 |
| 2015/0319294 | A1 | 11/2015 | Sudhir | |
| 2015/0334562 | A1 | 11/2015 | Perold et al. | |
| 2015/0355045 | A1* | 12/2015 | Solomon | F17D 5/02 702/36 |
| 2016/0034741 | A1* | 2/2016 | Lan | G06K 9/00 382/124 |
| 2016/0063230 | A1 | 3/2016 | Alten | |
| 2016/0092926 | A1 | 3/2016 | Herberger et al. | |
| 2016/0259497 | A1 | 9/2016 | Foss et al. | |
| 2016/0292410 | A1 | 10/2016 | Lu et al. | |
| 2017/0286967 | A1 | 10/2017 | Balinski et al. | |
| 2017/0344777 | A1 | 11/2017 | Vissa et al. | |
| 2018/0046347 | A1 | 2/2018 | Wang | |
| 2018/0173862 | A1 | 6/2018 | Li et al. | |
| 2018/0173865 | A1* | 6/2018 | Zhang | G06K 9/00013 |

FOREIGN PATENT DOCUMENTS

| | | |
|---|---|---|
| CN | 104021330 A | 9/2014 |
| CN | 104252389 A | 12/2014 |
| CN | 104299136 A | 1/2015 |
| CN | 105389203 A | 3/2016 |

OTHER PUBLICATIONS

Extended European search report issued in corresponding European application No. 16856692.5 dated Jun. 27, 2018.
Non final rejection issued in corresponding U.S. Appl. No. 15/985,122, dated Aug. 24, 2018.
Notice of allowance issued in corresponding U.S. Appl. No. 15/985,122, dated Nov. 16, 2018.
Examination report issued in corresponding IN application No. 201837004146, dated Sep. 17, 2020.

* cited by examiner

101 — WHETHER A FINGERPRINT IDENTIFICATION DEVICE IS OCCUPIED BY A HISTORICAL APPLICATION IS DETERMINED, WHEN A REQUEST OF A CURRENT APPLICATION TO INVOKE THE FINGERPRINT IDENTIFICATION DEVICE IS DETECTED

102 — DETERMINE WHETHER THE CURRENT APPLICATION SATISFIES A PRESET INVOKING CONDITION WHEN THE FINGERPRINT IDENTIFICATION DEVICE IS OCCUPIED BY THE HISTORICAL APPLICATION, AND CONTROL THE FINGERPRINT IDENTIFICATION DEVICE TO PROCESS THE REQUEST OF THE CURRENT APPLICATION ACCORDING TO A DETERMINING RESULT

FIG. 1

METHOD AND APPARATUS FOR INVOKING FINGERPRINT IDENTIFICATION DEVICE, AND TERMINAL

CROSS-REFERENCE TO RELATED APPLICATION(S)

This application is a continuation of International Application No. PCT/CN2016/091801, filed on Jul. 26, 2016, which claims priority to Chinese Patent Application No. 201510680682.X, filed on Oct. 19, 2015, the contents of both of which are hereby incorporated by reference in their entireties.

TECHNICAL FIELD

The present disclosure relates to the field of mobile terminals, and more particularly, to a method and an apparatus for invoking a fingerprint identification device, and a terminal.

BACKGROUND

For mobile terminals such as mobile phones and tablet PCs, users often carry it with them and store a large amount data concerning personal privacy and property security. Therefore, the security of mobile terminals is particularly important.

Biological features such as fingerprints have the characteristics of invariance, uniqueness, and convenience, and therefore, authentication based on biological features has the performance of high stability, reliability, and security. Nowadays, fingerprint identification technology has fully developed and mobile terminals are often equipped with fingerprint sensors and other fingerprint identification devices for fingerprint authentication, such as terminal unlocking, application unlocking, and fingerprint payment.

However, generally only one fingerprint identification device is provided in the mobile terminal, on the other hand, more and more applications need to invoke the fingerprint identification device in the mobile terminal. A conflict will occur when the fingerprint identification device is simultaneously invoked by multiple applications. As an example, application A needs to perform fingerprint payment and thus requests to invoke and then occupies the fingerprint identification device; meanwhile, if a user switches to application B which requires performing fingerprint unlocking, application B will attempt to request to invoke the fingerprint identification device when its interface is initialized. In this situation, application A may not release the occupation of the fingerprint identification device in time due to software defects or other reasons, and the fingerprint identification device will refuse the request of application B directly, therefore affecting the normal use for the user.

BRIEF DESCRIPTION OF THE DRAWINGS

FIG. 1 is a schematic flow diagram illustrating a method for invoking a fingerprint identification device according to a first implementation of the disclosure.

DETAILED DESCRIPTION

Figure 2:
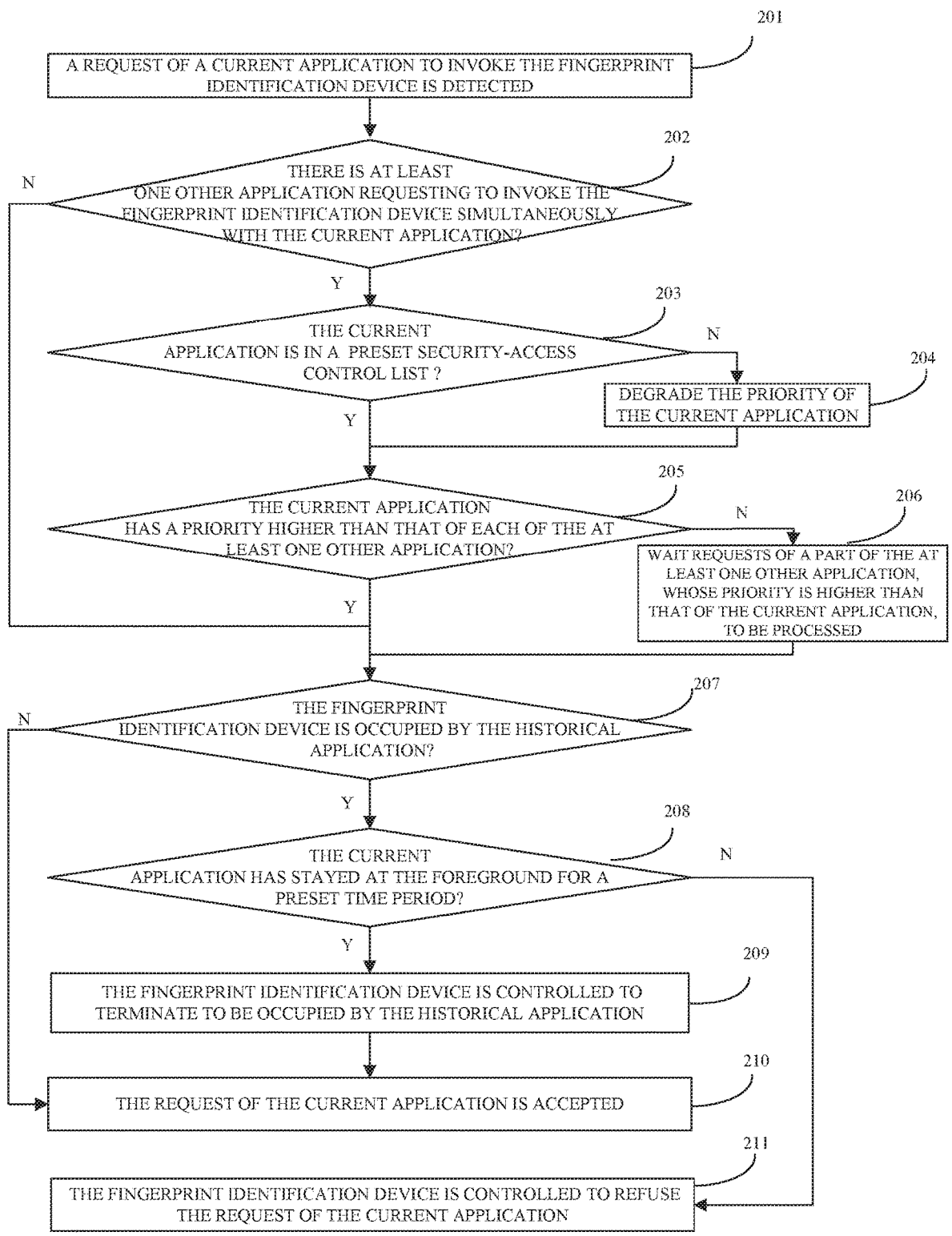
FIG. 2 is a schematic flow diagram illustrating a method for invoking a fingerprint identification device according to a second implementation of the disclosure.

Technical solutions of the present disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the present disclosure are illustrated in the accompanying drawings.

Before discussing the exemplary implementations in more detail, it should be mentioned that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

In the following, some of the terms used herein are explained to facilitate the understanding for those skilled in the art.

Terminal

Terminal, also known as a terminal device, terminal equipment, or user equipment (UE), means an electronic device that provides voice and/or data connectivity to a user, examples of which can be hand-held devices with wireless connectivity function, on-board devices, or the like. Common terminals can be, for example, mobile phones, tablets, laptops, handheld computers, mobile internet devices (MID), or wearable equipment such as smart watches, smart bracelets, and pedometers or others. Terminals in the present disclosure are not limited to mobile terminals and common terminals, but can also be automated teller machines (ATM), ticket machines, entrance guard machines, medical equipment, or other terminals equipped with fingerprint recognition function.

Fingerprint Sensor

A fingerprint sensor, also known as a fingerprint recognition module or fingerprint recognition sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touchscreen.

At present, more and more system applications and user-installed applications on the mobile terminal need to invoke the fingerprint identification device for fingerprint authentication. For example, when unlocking the mobile terminal, the fingerprint identification device may be invoked to perform fingerprint unlocking. As another example, there may be different scenarios that need fingerprint authentication in the same application. The following describes a Payment App (Such as Alipay®) as an example. When a user starts his/her Payment App, the fingerprint identification device may be invoked to authenticate the user's identity, which is equivalent to logging into the Payment App account and thus ensures the information security of the user's account. When the user needs to use the Payment App for payment, the Payment App will invoke the fingerprint identification device to authenticate the identity of the user again, and payment can only be made after authentication, thus ensuring the capital safety of the user. On a mobile terminal in the related art, an application usually attempts to request to invoke a fingerprint identification device when its interface is initialized. If the fingerprint identification device is occupied by another application, the fingerprint identification device will refuse the request of the application directly, thus affecting the normal use of the user. Taking the above into consideration, the present disclosure provides a technical scheme for invoking a fingerprint identification device.

First Implementation

FIG. 1 is a schematic flow diagram illustrating a method for invoking a fingerprint identification device according to a first implementation of the disclosure. The method may be performed by an apparatus for invoking a fingerprint identification device. The apparatus can be achieved by software and/or hardware and is generally integrated into a mobile terminal. In the method of invoking a fingerprint identification device, when a request of a current application to invoke a fingerprint identification device is detected or received, first determine whether the fingerprint identification device is occupied by a historical application, and if yes, further determine whether the current application satisfies a preset invoking condition, then control the fingerprint identification device to process the request based on a determination result.

As illustrated in FIG. 1, the method may include the following.

At block 102, a request of a current application to invoke a fingerprint identification device is detected. As mentioned above, the fingerprint identification device can be a fingerprint sensor, and can be invoked for fingerprint identification.

At block 104, determine whether the fingerprint identification device is occupied by a historical application.

As an example, "mobile terminal" referred to herein may be a mobile phone, a smart watch, a tablet computer, a notebook computer, or other devices equipped with a fingerprint sensor. In one implementation, the mobile terminal is a smart phone. Those skilled in the art will know that, an apparatus used to perform the method described in the implementation is not limited to being integrated into a mobile terminal, but may also be integrated into other electronic devices such as a desktop computer provided with a fingerprint sensor. Generally, integration into a mobile terminal is advantageous because the beneficial effects are more obvious and therefore, the implementations of the present disclosure are illustrated by taking the apparatus integrated into a mobile terminal as an example.

Common fingerprint identification devices include optical fingerprint sensors and semiconductor fingerprint sensors, and the implementations of the disclosure do not limit the type and model of the fingerprint identification device.

The current application and the historical application in this implementation can include applications as well as different application scenarios in the applications. In particular, the current application may refer to an application that the mobile terminal is processing, and the historical application may refer to an application that the mobile terminal processed before the current application. For example, if a user wants to make a fingerprint payment when he or she uses an Instant Messenger App (such as WeChat®), the user may start a Payment App (Such as Alipay®), which requires fingerprint logging. In this case, the Payment App is the current application, and the Instant Messenger App is the historical application. As another example, a fingerprint logging scenario and a fingerprint payment scenario may be involved in the Payment App, which means that fingerprint logging is required before a fingerprint payment can be made; thus, the fingerprint payment is the current application and the fingerprint logging is the historical application.

As mentioned above, in the related art, in case that the Payment App attempts to request to invoke the fingerprint identification device when the interface of the Payment App is initialized, and at this point, if the instant Messenger App does not release the occupation of the fingerprint identification device in time, the fingerprint identification device will refuse the request of the Payment App directly, thus the user would not be able to access the Payment App through fingerprint identification. For a further example, when the user wants to use the fingerprint payment function of the Payment App, then the fingerprint payment scenario will attempt to request to invoke the fingerprint identification device when the interface of the fingerprint payment scenario is initialized, and at this point, if the fingerprint logging scenario of the Payment App does not release the occupation of the fingerprint identification device in time, the fingerprint identification device will refuse the request of the fingerprint payment scenario of the Payment App directly, thus, it is impossible for the user to make fingerprint payment in the Payment App through fingerprint identification.

In the implementation, when the request of the current application to invoke the fingerprint identification device is detected, whether the fingerprint identification device is occupied by the historical application will be determined first, thereby avoiding that the request of the current application to invoke the fingerprint identification device is refused directly.

At block 106, when the fingerprint identification device is occupied by the historical application, determine whether the current application satisfies a preset invoking condition, and control the fingerprint identification device to process the request of the current application according to a determination result.

In one implementation, the preset invoking condition is that one application has stayed in the foreground for a preset time period. Based on this, the current application satisfies the preset invoking condition if it has stayed in the foreground for the preset time period (or even exceed the preset time period), otherwise, the current application does not satisfy the preset invoking condition. The time period of staying in the foreground can be a duration that the current application has been continuously displayed on the display screen. The preset time period may be set by a system default or by a user according to his or her personal usage habit. Designers can determine the preset time period while fully considering a time period that the user can perceive the abnormality of the fingerprint identification device, such that the conflict of invoking the fingerprint identification device can be solved before the user is aware of the problem. For example, the preset time period can be set as 1 second or even less than 1 second.

The fingerprint identification device can be controlled to process the request of the current application according to the determination result as follows.

Example 1

If the current application satisfies the preset invoking condition, the fingerprint identification device is controlled to terminate to be occupied by the historical application and accept the request of the current application.

Example 2

If the current application does not satisfy the preset invoking condition, then the fingerprint identification device is controlled to refuse the request of the current application. Alternatively, if the current application does not satisfy the preset invoking condition, the fingerprint identification device can also be controlled to ignore and skip processing of the request of the current application.

According to the method for invoking a fingerprint identification device of the first implementation of the disclosure, when the request of the current application to invoke the fingerprint identification device is detected, whether the fingerprint identification device is occupied by the historical application is determined. Whether the current application satisfies the preset invoking condition is determined if the fingerprint identification device is occupied by the historical application, and the fingerprint identification device is controlled to process the request of the current application according to the determination result. With aid of the technical schemes above, when the mobile terminal wants to enable the current application according to a user operation and the current application needs to realize fingerprint authentication through the fingerprint identification device, the current application will send a request to invoke the fingerprint identification device. If the fingerprint identification device is occupied by the historical application, the fingerprint identification device will first determine whether the current application meets the preset invoking condition instead of refusing the request of the current application immediately, and then the fingerprint identification device is controlled to process the request of the current application according to the determination result. Thus, the conflict of invoking the fingerprint identification device occurred when the fingerprint identification device is not released in time by the historical application can be prevented, so as to guarantee the normal operation of the current application and improve user experience. The speed of a processor of a terminal can also be improved since conflicts occurred when invoking fingerprint identification device can be avoided.

Second Implementation

FIG. 2 is a schematic flowchart illustrating a method for invoking a fingerprint identification device according to a second implementation of the disclosure. The implementation is optimized on the basis of the first implementation.

As an example, the fingerprint identification device is a public resource in the mobile terminal and it can be invoked by either user-visible foreground applications or applications of background processes. Therefore, there may be multiple applications that simultaneously request to invoke the fingerprint identification device.

Based on the above, as one implementation, the method further includes the follows. When the request of the current application to invoke the fingerprint identification device is detected, determine whether there is at least one other application requesting to invoke the fingerprint identification device simultaneously with the current application; and if yes, further determine whether the current application has a priority higher than that of each of the at least one other application and if so, further determine whether the fingerprint identification device is occupied by the historical application.

As another implementation, the method may further include determining whether the current application is in a preset security-access control list, and degrading the priority of the current application based on a determination that the current application is not in the preset security-access control list.

As illustrated in FIG. 2, the method in this implementation includes the following.

At block 201, a request of a current application to invoke a fingerprint identification device (such as a fingerprint sensor) is detected.

At block 202, whether there is at least one other application requesting to invoke the fingerprint identification device simultaneously with the current application is determined. If yes, proceed to block 203; otherwise, proceed to block 207.

At block 203, whether the current application is in a preset security-access control list is determined. If yes, proceed to block 205; otherwise, proceed to block 204.

As an implementation, the preset security-access control list includes application information having security access. The current application is determined to be in the preset security-access control list when application information of the current application has security access. Which applications are in the preset security-access control list can be set by the system, or set by the user according to personal circumstances. For example, for a mobile terminal with an Android system, when installing an application, if the system detects that an Android package corresponding to the application has a preset security identification (ID for short), the application can be added into a preset security-access control list. As another example, when a user trusts an application, then he or she can add the application to the preset security-access control list.

At block 204, degrade the priority of the current application and proceed to block 205. Alternatively, operations at block 203 and block 204 can be performed before block 202 and the present disclosure is not limited thereto.

As one implementation, priorities of different applications can be set by the system or by the user. The priorities may have multiple levels. In this step, the priority of the current application can be degraded by a preset number of levels. The number of levels of priorities and the preset number of levels degraded can be adjusted according to actual situations. Further, the priority of the current application can be directly degraded to the lowest level, and then the method proceeds to block 205.

At block 205, whether the current application has a priority higher than that of each of the at least one other application is determined, and if yes, proceed to block 207, otherwise, proceed to block 206.

As an example, in case that the operation at block 205 is performed after the operation at block 204 is completed, the priority of the current application referred to at block 205 is the degraded priority of the current application.

At block 206, a request(s) of one or more applications among the at least one other application, whose priority is higher than that of the current application, is awaited to be processed and then the method proceeds to block 207.

In one implementation, the requests of all applications simultaneously requesting to invoke the fingerprint identification device can be sorted based on priority and processed sequentially by a fingerprint sensor.

At block 207, whether the fingerprint identification device is occupied by the historical application is determined. If yes, proceed to block 208 otherwise, proceed to block 210.

In case that the operation at block 207 is performed after the operation at block 206 is completed (205-->206-->207) rather than immediately after the operation at block 205 (205-->207) is completed, the historical application referred to at block 207 should include other applications (that is, the applications processed at block 206) having priorities higher than that of the current application.

At block 208, whether the current application has stayed in the foreground for a preset time period is determined. If yes, proceed to block 209; otherwise, proceed to block 211.

At block 209, the fingerprint identification device is controlled to terminate to be occupied by the historical application and the method proceeds to block 210.

At block 210, the request of the current application is accepted.

At block 211, the fingerprint identification device is controlled to refuse the request of the current application.

In the method for invoking a fingerprint identification device according to the second implementation, when other applications and the current application simultaneously request to invoke the fingerprint identification device, whether the current application has a priority higher than that of each of the other applications is determined. Continuing, whether the fingerprint identification device is occupied by the historical application is determined when the current application has a priority higher than that of each of the at least one other application. Therefore, it is possible to further avoid the conflict occurred when multiple applications simultaneously request to invoke the fingerprint identification device, thus ensure each application can operate normally, and thereby improving the user experience.

Third Implementation

Figure 3:
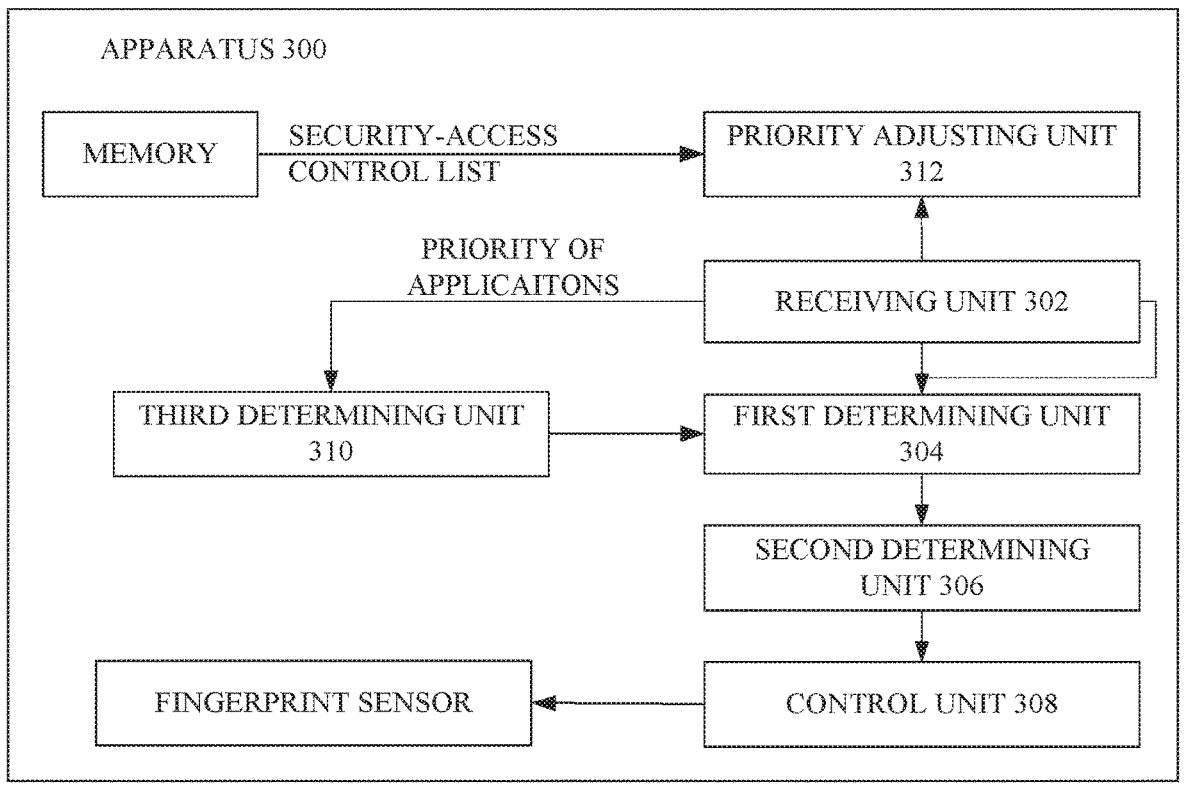
FIG. 3 is a block diagram illustrating an apparatus for invoking a fingerprint identification device according to a third implementation of the disclosure.

FIG. 3 is a block diagram illustrating an apparatus for invoking a fingerprint identification device according to a third implementation of the disclosure. The apparatus can be implemented by software and/or hardware, and is generally integrated into a mobile terminal. The apparatus can invoke a fingerprint identification device via the foregoing method for invoking a fingerprint identification device. As illustrated in FIG. 3, an apparatus 300 may include a receiving unit 302, a first determining unit 304, a second determining unit 306, and a control unit 308.

The receiving unit 302 can be a receiver, a transmitter, a detector, a detecting circuit, or other components with a receiving or detecting function. The receiving unit 302 is configured to receive or detect a request of a current application to invoke a fingerprint identification device such as a fingerprint sensor.

The first determining unit 304 can be implemented as a processor or a logic circuit, and is configured to determine whether a fingerprint identification device is occupied by a historical application when the request of the current application to invoke the fingerprint identification device is detected by the receiving unit 302.

The second determining unit 306 can be implemented as a processor or a logic circuit, and is configured to determine whether the current application satisfies a preset invoking condition when first determining unit 304 determines that the fingerprint identification device is occupied by the historical application.

The control unit 308 can be a controller and is configured to control the fingerprint identification device to process the request of the current application according to a determination result of the second determining unit 306.

In the apparatus for invoking the fingerprint identification device according to the third implementation of the disclosure, the first determining unit 304 determines whether the fingerprint identification device is occupied by the historical application when the request of the current application to invoke the fingerprint identification device is detected by the receiving unit 302. When the fingerprint identification device is occupied by the historical application, the second determining unit 306 determines whether the current application satisfies the preset invoking condition. Then the control unit 308 controls the fingerprint identification device to process the request of the current application according to the determination result of the second determining unit 306. By adopting the technical scheme above, when the mobile terminal wants to enable the current application according to a user operation, if the fingerprint identification device is occupied by the historical application, the fingerprint identification device will first determine whether the current application meets the preset invoking condition instead of refusing the request of the current application immediately, and then the fingerprint identification device is controlled to process the request of the current application according to the determination result. Thus, the conflict of invoking the fingerprint identification device occurred when the fingerprint identification device is not released in time by the historical application can be prevented, thus can guarantee the normal operation of the current application and improve user experience.

Based on the above implementations, the second determining unit 306 is configured to determine whether the current application has stayed in the foreground for a preset time period, and determine that the current application satisfies the preset invoking condition if the current application has stayed in the foreground for the preset time period.

Based on the above implementations, the control unit 308 is configured to control the fingerprint identification device to terminate to be occupied by the historical application and accept the request of the current application, when the current application satisfies the preset invoking condition, or refuse the request of the current application when the current application does not satisfy the preset invoking condition.

When implemented, more than one application may request to invoke the fingerprint identification device concurrently, and in this situation, in addition to the request to invoke the fingerprint identification device of the current application, the receiving unit 302 may receive or detect requests of at least one other application to invoke the fingerprint identification device.

Here, the apparatus may further include a third determining unit 310. The third determining unit 310 is configured to determine or compare priorities among different applications. For example, the third determining unit 310 is configured to determine whether the current application has a priority higher than that of each of the at least one other application when there is the at least one other application requesting to invoke the fingerprint identification device simultaneously with the current application. When the third determining unit 310 determines that the current application has a priority higher than that of each of the at least one other application, the first determining unit 304 will operate to determine whether the fingerprint identification device is occupied by the historical application.

The first determining unit 304 will await requests of a part of the at least one other application, whose priority is higher than that of the current application, to be processed, and then operate to determine whether the fingerprint identification device is occupied by the historical application.

As one implementation, the other applications, whose priority is higher than that of the current application, will be sorted according to priority (for example, by the third determining unit 310) and then processed sequentially (for example, by the fingerprint identification device under control of a processor).

Based on the above, the apparatus 300 further includes a priority adjusting unit 312. The priority adjusting unit 312 is configured to determine whether the current application is in a preset security-access control list and degrade the priority of the current application based on a determination that the current application is not in the preset security-access control list. The preset security-access control list can be stored in a memory. For example, the priority adjusting unit 312 can conduct the above operation before the third determining unit 310 determines whether the current application has a priority higher than that of each of the at least one other application.

In one implementation, the priority adjusting unit 312 configured to degrade the priority of the current application is configured to degrade the priority of the current application according to a preset number of grades or levels.

Fourth Implementation

A terminal is provided in the fourth implementation. The terminal includes the apparatus for invoking a fingerprint identification device described above. The fingerprint identification device can be invoked by performing the foregoing method for invoking a fingerprint identification device.

Figure 4:
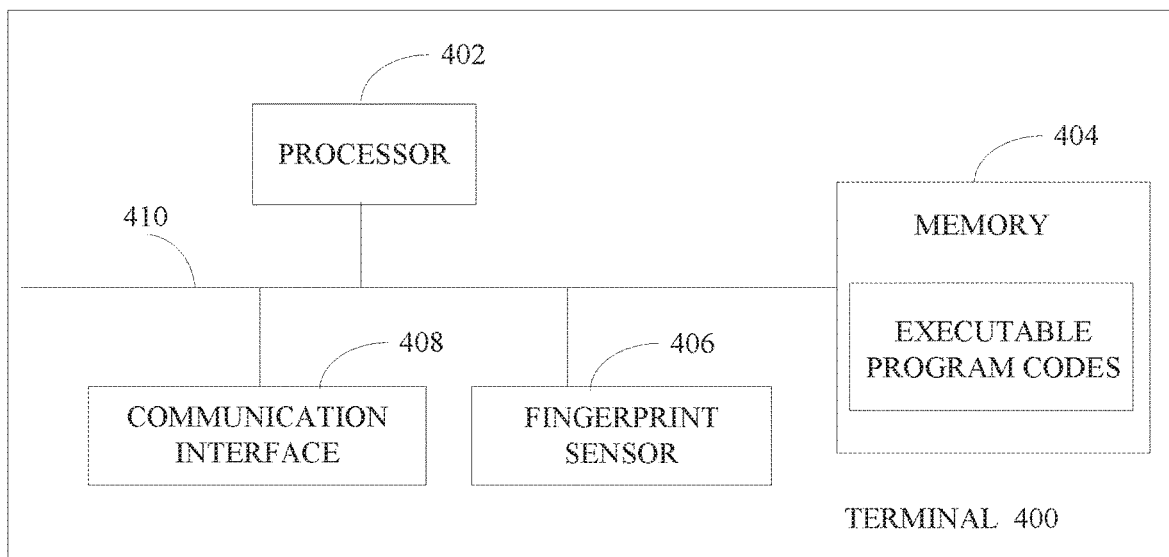
FIG. 4 is a block diagram illustrating a terminal according to a fourth implementation of the disclosure.

As illustrated in FIG. 4, a terminal 400 includes a processor 402, a memory 404, a fingerprint sensor 406, a communication interface 408, and a bus 410. The processor 402, the memory 404, the fingerprint sensor 406, and the communication interface 408 can be coupled and communicated via the bus 410.

The processor 402 may be one of a central processing unit (CPU), a micro-processor, an application-specific integrated circuit ASIC), or one or more integrated circuits for controlling the programs for the implementation of above-mentioned technical solutions, and controls wireless communication with an external cellular network via the communication interface 408. The communication interface 408 includes, but is not limited to, an antenna, an amplifier, a transceiver, a coupler, a low noise amplifier (LNA), a duplexer and so on, and is configured to communicate with other devices or communication networks such as Ethernet, radio access network (RAN), wireless local area network (WLAN) and the like. The fingerprint sensor 406 is configured to acquire fingerprint data of a finger of a user. The memory 404 includes at least one of a random access memory (RAM), a non-volatile memory, and an external memory, the memory 404 is configured to store executable program codes that executes the above-mentioned technical schemes and is controlled by the processor 402. The executable program codes can guide the processor 402 to execute the method illustrated with reference to FIG. 3 of the present disclosure. The memory 404 can exist independently and connect to the processor 402 via the bus 410. The memory 404 can also be integrated with the processor 402.

The memory 404 is configured to store program codes which when executed by the processor 402 become operational with the processor 402 to: receive a request of a current application to invoke the fingerprint sensor 406; determine whether the fingerprint sensor 406 is occupied by a historical application; determine whether the current application satisfies a preset invoking condition when the fingerprint sensor 406 is occupied by the historical application; control the fingerprint sensor 406 to process the request of the current application according to a determination result.

The processor 402 is configured to receive at least one other application requesting to invoke the fingerprint sensor 406 simultaneously with the current application, and determine whether the current application has a priority higher than that of each of the at least one other application.

The processor 402 configured to determine whether the fingerprint sensor 406 is occupied by a historical application is configured to perform one of: determining whether the fingerprint sensor 406 is occupied by the historical application, when the current application has a priority higher than that of each of the at least one other application; awaiting requests of a part of the at least one other application to be processed, when the current application has a priority lower than that of the part of the at least one other application.

The terminal in this implementation may be a mobile phone, a smart watch, a tablet computer, and a notebook computer that is equipped with a fingerprint sensor. The fingerprint sensor is coupled with the apparatus for invoking a fingerprint identification device.

When the terminal wants to switch from the historical application to the current application, if the fingerprint sensor is still occupied by the historical application, the fingerprint sensor will first determine whether the current application meets the preset invoking condition instead of refusing the request of the current application immediately, and then is controlled to process the request of the current application according to the determination result. Thus, the conflict of invoking the fingerprint sensor occurred when the fingerprint sensor is not released in time by the historical application can be avoided, such that the current application can operate normally and user experience can be improved.

The product above can perform the methods provided in the implementations of the disclosure, and have components configured to perform the methods and can achieve corresponding advantageous effects. Technical details not described in detail in this implementation can be found in the method provided in any implementation of the disclosure.

It should be noted that the above is merely exemplary implementations of the present disclosure and applied technical principles. Those skilled in the art should understand that the present disclosure is not limited to the specific implementations described herein, and various obvious changes, re-modifications, and substitutions can be made by those skilled in the art without departing from the scope of the present disclosure. Therefore, although the present disclosure has been described in detail by way of the above implementations, the present disclosure is not limited to the above implementations and other equivalent implementations may be included without departing from the concept of the present disclosure. However, the scope of the present disclosure shall be subject to the scope of the appended claims.

What is claimed is:

1. A method for invoking a fingerprint identification device, comprising:
    detecting, by a mobile terminal, a request of a current application to invoke a fingerprint identification device to conduct a fingerprint authentication;
    detecting, by the mobile terminal, at least one other application requesting to invoke the fingerprint identification device simultaneously with the current application;

determining, by the mobile terminal, whether a priority of the current application higher than a priority of the at least one other application;

when the priority of the current application is higher than the priority of the at least one other application, determining, by the mobile terminal, whether the fingerprint identification device is occupied by a historical application;

when the fingerprint identification device is occupied by the historical application, determining, by the mobile terminal, whether the current application has stayed in a foreground for a preset time period;

based on a determination that the current application has stayed in the foreground for the preset time period, determining, by the mobile terminal, whether the current application satisfies a preset invoking condition; and controlling, by the mobile terminal, the fingerprint identification device to process the request of the current application based on a determination result of whether the current application satisfies the preset invoking condition.

2. The method of claim 1, wherein controlling the fingerprint identification device to process the request of the current application based on the determination result comprises:

controlling the fingerprint identification device to terminate to be occupied by the historical application and accepting the request of the current application when the current application satisfies the preset invoking condition.

3. The method of claim 1, further comprising:
controlling the fingerprint identification device to refuse the request of the current application when the current application does not satisfy the preset invoking condition.

4. The method of claim 1, further comprising:
awaiting requests of a part of the at least one other application to be processed when the priority of the current application is lower than the priority of the at least one other application.

5. The method of claim 4, wherein awaiting the requests of the part of the at least one other application to be processed comprises:

awaiting the requests of the part of the at least one other application to be sorted based on priority and processed sequentially.

6. The method of claim 4, further comprising:
before determining whether the priority of the current application is higher than the priority of the at least one other application:

determining whether the current application is in a preset security-access control list, and degrading the priority of the current application based on a determination that the current application is not in the preset security-access control list.

7. The method of claim 6, wherein the preset security-access control list comprises application information having security access, and determining whether the current application is in the preset security-access control list comprises:

determining that the current application is in the preset security-access control list when the application information of the current application has security access.

8. The method of claim 6, wherein degrading the priority of the current application comprises:

degrading the priority of the current application according to a preset number of levels.

9. An apparatus for invoking a fingerprint identification device, comprising:

a processor; and a memory, coupled with the processor and configured to store program codes which when executed by the processor become operational with the processor to:

receive a request of a current application to invoke a fingerprint identification device to conduct fingerprint authentication;

detect at least one other application requesting to invoke the fingerprint identification device simultaneously with the current application;

determine whether a priority of the current application is higher than a priority of the at least one other application;

when the priority of the current application is higher than the priority of the at least one other application, determine whether the fingerprint identification device is occupied by a historical application;

when the fingerprint identification device is occupied by the historical application, determine whether the current application has stayed in a foreground for a preset time period;

based on a determination that the current application has stayed in the foreground for the preset time period, determine whether the current application satisfies a preset invoking condition; and control the fingerprint identification device to process the request of the current application according to a determination result of whether the current application satisfies the preset invoking condition.

10. The apparatus of claim 9, wherein the processor configured to control the fingerprint identification device to process the request of the current application according to the determination result is further configured to perform one of:

controlling the fingerprint identification device to terminate to be occupied by the historical application and accepting the request of the current application when the current application satisfies the preset invoking condition; or controlling the fingerprint identification device to refuse the request of the current application when the current application does not satisfy the preset invoking condition.

11. The apparatus of claim 9, wherein the processor is further configured to:

await requests of a part of the at least one other application to be processed when the priority of the current application is lower than the priority of the at least one other application.

12. The apparatus of claim 11, wherein the processor configured to await the requests of the part of the at least one other application to be processed is configured to:

await the requests of the part of the at least one other application to be sorted based on priority and processed in turn.

13. The apparatus of claim 11, wherein the processor is further configured to:

determine whether the current application is in a preset security-access control list and degrade the priority of the current application based on a determination that the current application is not in the preset security-access control list, before determining whether the priority of the current application is higher than the priority of the at least one other application.

14. The apparatus of claim 13, wherein the processor configured to degrade the priority of the current application is configured to degrade the priority of the current application according to a preset number of levels.

15. A terminal, comprising:
- a fingerprint sensor;
- a processor coupled with the fingerprint sensor; and
- a memory coupled with the processor and configured to store program codes which when executed by the processor become operational with the processor to:
  - receive a request of a current application to invoke the fingerprint sensor to conduct fingerprint authentication;
  - detect at least one other application requesting to invoke a fingerprint identification device simultaneously with the current application;
  - determine whether a priority of the current application is higher than a priority of the at least one other application;
  - when the priority of the currently application is higher than the priority of the at least one other application, determine whether the fingerprint sensor is occupied by a historical application;
  - when the fingerprint sensor is occupied by the historical application, determine whether the current application has stayed in a foreground for a preset time period;
  - based on a determination that the current application has stayed in the foreground for the preset time period, determine whether the current application satisfies a preset invoking condition; and
  - control the fingerprint sensor to process the request of the current application according to a determination result of whether the current application satisfies the preset invoking condition.

16. The terminal of claim 15, wherein the processor is further configured to:
- await requests of a part of the at least one other application to be processed when the priority of the current application is lower than the priority of the at least one other application.

* * * * *